United States Patent
Sako et al.

[11] Patent Number: 6,108,061
[45] Date of Patent: Aug. 22, 2000

[54] LIQUID CRYSTAL ELEMENT STABILIZED BY THE USE OF POLYMER RETICULATE STRUCTURE, AND MANUFACTURING METHOD THEREOF

[75] Inventors: Teiyu Sako; Aya Miyazaki, both of Kashiwa; Akira Sakaigawa, Kawasaki; Mitsuhiro Koden, Kashiwa, all of Japan

[73] Assignees: Sharp Kabushiki Kaisha, Osaka, Japan; The Secretary of State for Defence in Her Britannic Majesty's Government of the Kingdom of Great Britain and Northern Ireland, Hants, United Kingdom

[21] Appl. No.: 08/818,176

[22] Filed: Mar. 14, 1997

[30] Foreign Application Priority Data

Apr. 17, 1996 [JP] Japan .................................. 8-095742

[51] Int. Cl.[7] .................................................. G02F 1/1333
[52] U.S. Cl. ................................ 349/85; 349/88; 349/89; 349/93
[58] Field of Search ................................ 349/88, 94, 93, 349/89, 173, 85

[56] References Cited

U.S. PATENT DOCUMENTS

| | | | |
|---|---|---|---|
| 4,101,207 | 7/1978 | Taylor ....................................... | 349/89 |
| 4,810,433 | 3/1989 | Takayanagi et al. ...................... | 264/22 |
| 5,011,624 | 4/1991 | Yamagishi et al. ....................... | 349/89 |
| 5,332,521 | 7/1994 | Yuasa et al. .............................. | 349/89 |
| 5,354,498 | 10/1994 | Akashi et al. ........................... | 349/89 |
| 5,504,600 | 4/1996 | Pirs et al. .................................. | 349/89 |
| 5,525,273 | 6/1996 | Konuma et al. ......................... | 264/1.38 |
| 5,566,009 | 10/1996 | Yamazaki et al. ........................ | 359/51 |
| 5,589,959 | 12/1996 | Hikmet ..................................... | 349/88 |
| 5,627,665 | 5/1997 | Yamada et al. .......................... | 349/94 |
| 5,658,492 | 8/1997 | Murashiro et al. ................ | 252/299.61 |
| 5,691,795 | 11/1997 | Doane et al. ............................. | 349/88 |
| 5,707,543 | 1/1998 | Akashi et al. ..................... | 252/299.01 |
| 5,773,178 | 6/1998 | Shiota et al. ............................. | 430/20 |

FOREIGN PATENT DOCUMENTS

| | | |
|---|---|---|
| 0275999 | 7/1988 | European Pat. Off. . |
| 0665279 | 8/1995 | European Pat. Off. . |
| 6-194635 | 7/1994 | Japan . |
| 9604586 | 2/1996 | WIPO . |
| 9607123 | 3/1996 | WIPO . |

OTHER PUBLICATIONS

U.S. application No. 08/728,200; filed Oct. 10, 1996.
R.A.M. Hikmet et al., Liquid Crystal, 1995, vol. 19, No. 1, p. 65–76 "Ferroelectric Liquid Crystal Gels Network Stabilized Ferroelectric Displays."
J.C. Jones et al., Ferroelectrics, 1991, vol. 121, p. 91–192 "The Importance of Dielectric Biaxiality for Ferroelectric Liquid Crystal Devices."

*Primary Examiner*—William L. Sikes
*Assistant Examiner*—Tarifur R. Chowdhury

[57] ABSTRACT

Monomers with photopolymerization characteristics and an initiator for polymerization are added to a liquid crystal composition having a ferroelectric liquid crystal phase (S5). In a state (S6) where coexist two domains which differ from each other in directions of molecular major axes in the ferroelectric liquid crystal phase, light is projected to the liquid crystal layer to form a polymer reticulate structure therein (S7). As a result, this state is made a stable one and the liquid crystal shows macroscopic switching behaviors among two states causing dark and bright displays respectively, and the above-described state causing halftone display.

27 Claims, 11 Drawing Sheets

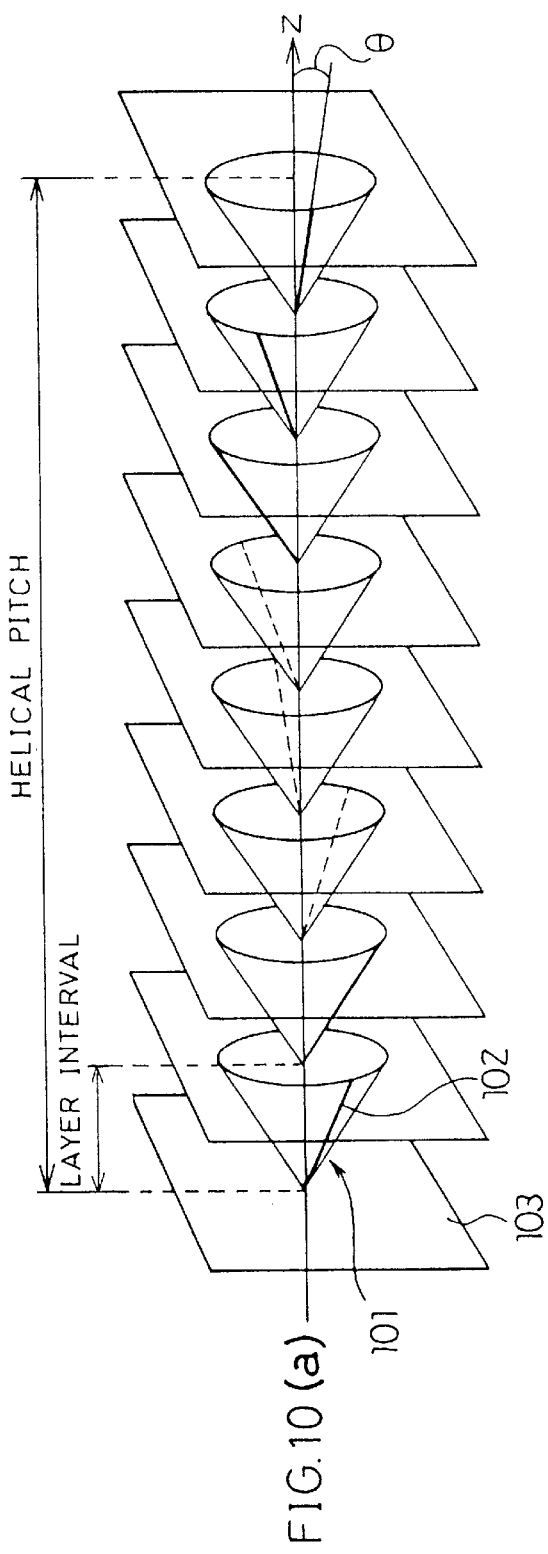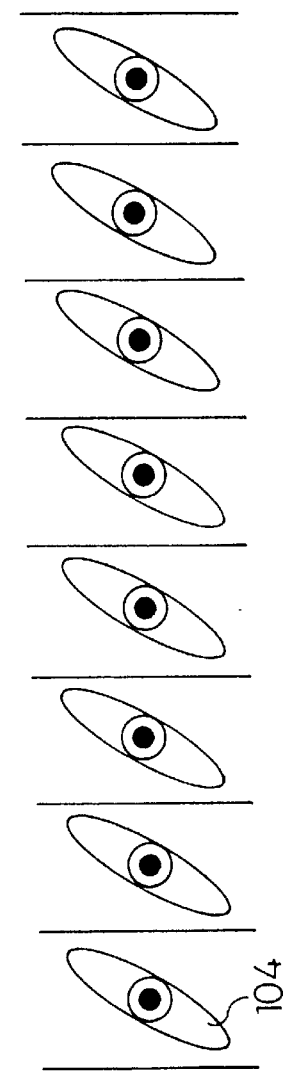
FIG.10(a)
FIG.10(b)

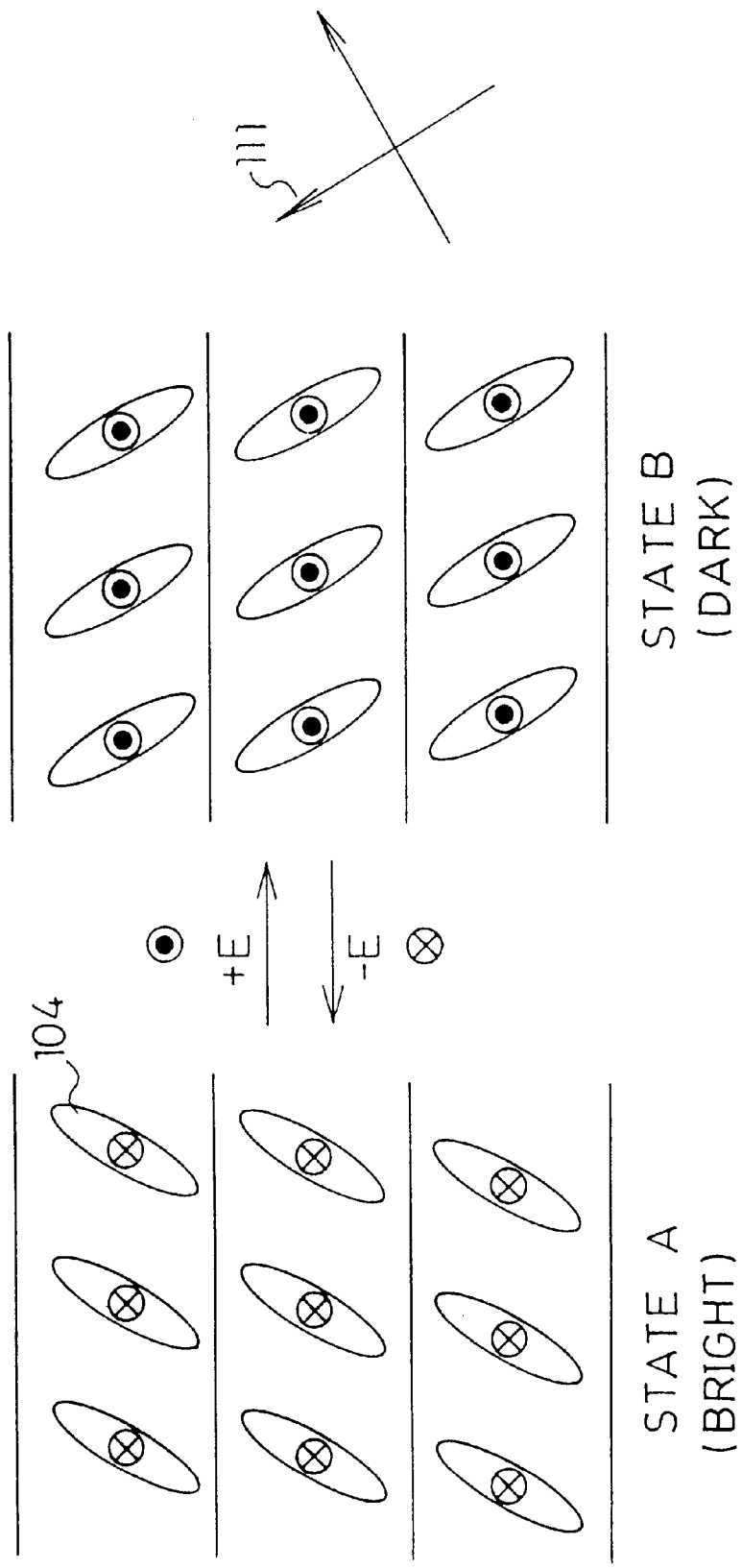

LIQUID CRYSTAL ELEMENT STABILIZED BY THE USE OF POLYMER RETICULATE STRUCTURE, AND MANUFACTURING METHOD THEREOF

FIELD OF THE INVENTION

The present invention relates to a liquid crystal element for use in a display device, an optical shutter, an optical filter, an optical sensor, or the like, and more particularly relates to a liquid crystal element having a stable state due to restraint of a polymer reticulate structure formed in the liquid crystal, and relates to a manufacturing method of the liquid crystal element.

BACKGROUND OF THE INVENTION

Conventionally well known are a TN (twisted nematic) liquid crystal display element and an STN (super-twisted nematic) liquid crystal element wherein nematic liquid crystal is utilized. But these liquid crystal display elements have a limited display capacity, since these liquid crystal elements' speed of electro-optical response is very low, in a millisecond order, which leads to defects such as disorder in the screen, deterioration in the contrast, or the like, when a high speed driving is attempted. Therefore, practical application of a liquid crystal display element using the ferroelectric or antiferroelectric liquid crystal has recently been considered, as liquid crystal display device of the next generation.

In 1975, in the light with the theory of the symmetry of the molecule, R. B. Meyer et al. presumed that optically active molecules which have a dipole moment in a direction perpendicular to the molecular major axis should exhibit ferroelectricity in a chiral smectic C phase (SmC* phase). They composited DOBAMBC (2-methylbutyl p-[p-(decyloxybenzylidene)-aminon]-cinnamate), and for the first time confirmed the ferroelectricity of liquid crystal (see R. B. Meyer, L. Liebert, L. Strzelecki, and P. Keller: Journal of Physics (Paris)36(1975)L.69).

The following description will explain a structure of liquid crystal in the SmC* phase which exhibits ferroelectricity. In the SmC* phase, the center of gravity positions of liquid crystal molecules in one layer are not in order, but major axes of the liquid crystal molecules (directors 102) are tilted at a uniform angle θ to a layer normal line z of layer planes 103 which serve as boundary between the smectic layers, as schematically illustrated by cones 101 in FIG. 10($a$). Note that the directors 102 are tilted in directions slightly changing from one layer to another, thereby causing the crystal molecules to be aligned in a helical form. A pitch of the helix (helical pitch) is around 1 $\mu$m, by far greater than a layer interval which is around 1 nm.

It has been confirmed that not only the ferroelectric liquid crystals but also some of antiferroelectric liquid crystals have the phase having the above-described molecular arrangement (see A. D. L. Chandani, T. Hagiwara, Y. Suzuki, Y. Ouchi, H. Takezoe, and A. Fukuda: Japan Journal of Applied Physics 27(1988)L729). Among the antiferroelectric liquid crystals, some have the SmC* phase depending on the optical purity, and some, like MMPOBC (4-(1-methylheptyloxycarbonyl)phenyl 4'-octyloxybiphenyl-4-carboxylate), have the SmC* phase even though they are rectus enantiomers or sinister enantiomers with the optical purity of 100 percent.

Clark and Lagerwall discovered that when the liquid crystal has a cell thickness of not more than around 1 $\mu$m (around the helical pitch), the helical structure disappears and molecules 104 in each layer become in either of bi-stable states depending on an electric field applied thereto, as shown in FIG. 10($b$), and proposed a surface stabilized ferroelectric liquid crystal (SSFLC) display element. This is disclosed in the Japanese Publication for Laid-open Patent Application No. 56-107216/1981 (Tokukaisho 56-107216), the specification of the U.S. Pat. No. 4367924, and others. Note that in FIG. 10($b$), the electric field applied to the molecules 104 is directed from the reverse side to the front side of the sheet of paper having the figure so as to be perpendicular to the sheet of paper. In addition, all the electric dipole moments of the molecules 104 are directed in the direction of the applied electric field, as indicated in each molecule in FIG. 10($b$).

The following description will explain an operation principle of the SSFLC element, referring to FIG. 11. As described, the SSFLC molecules 104 in a thin cell has either a stable state A or a stable state B in accordance with a direction of the electric field applied. Note that the electric field applied to the molecules 104 is, in the state A, directed from the front side to the reverse side of the sheet of paper having the figure so as to be perpendicular to the sheet of paper, while it is, in the state B, directed from the reverse side to the front side of the sheet of paper so as to be perpendicular to the sheet of paper.

Therefore, by providing the SSFLC cell between two polarizers orthogonal to each other so that, for example, in the state B the molecular major axes are parallel to one of the directions of the polarizers (direction 111 indicated by an arrow in the figure). With this arrangement, the SSFLC cell becomes bright in the state A since light is allowed to penetrate, while the SSFLC cell becomes dark in the state B since light is shut out. In other words, monochrome display can be realized by switching the directions of the electric field applied.

Since in the SSFLC a spontaneous polarization and the electric field applied directly and reciprocally act with each other, the SSFLC exhibits a high speed response to the electric field in a millisecond order, or a further quicker response, unlike in the case where switching operations are conducted with respect to a usual nematic liquid crystal by utilizing dielectric anisotropy. Furthermore, permanent application of a voltage is not required since the SSFLC has a feature that once being switched to either of the bi-stable states the maintains the state even after the electric field disappears, which is a so-called memory function.

Therefore, by utilizing the above-described characteristics of the SSFLC, i.e., the high speed response and the memory function, which make it possible to write data to be displayed to each scanning line at a high speed, it is possible to realize a simple matrix drive-type SSFLC display device having a large capacity. Its application to a wall TV set is also expected.

However, the conventional SSFLC display device has several problems. The serious problems to be solved in particular are to realize halftone display and to enhance shock resistance.

Though, strictly speaking, the ferroelectric liquid crystal is only capable of two-tone display due to the bi-stability of the liquid crystal molecules in the SmC* phase, arrangements enabling display in several tones have been proposed, which utilize the method of high speed modulation of the applied electric field, or the area division method. However, these conventional arrangements make the driving system or the panel manufacturing processes complicated and difficult, thereby raising the manufacturing costs, and hence causing the ferroelectric liquid crystal to be unsuitable for the practical application.

The enhancement of the shock resistance is also one of the problems which have not yet been solved, in view of the practical application of the arrangement wherein the ferroelectric liquid crystal is used. To be more specific, the SSFLC display device has defects that it is easily affected by pressure from outside, an electric shocks, or the like, and hence the alignment is easily disordered with the same. To solve this problem, an arrangement using spacer walls between substrates has been proposed, but various problems have arisen in the panel manufacturing processes, thereby resulting in that the practical application of the above arrangement has been unrealized.

SUMMARY OF THE INVENTION

The object of the present invention is (1) to provide a ferroelectric liquid crystal element which is capable of a gray level display, i.e., an intermediate between the white and black displays, (2) to enhance the shock resistance of the ferroelectric liquid crystal element, and (3) to realize display with high contrast and brightness.

To achieve the above-described object, a ferroelectric liquid crystal element of the present invention includes: (1) a pair of substrates each having electrodes, and (2) a ferroelectric liquid crystal layer between said substrates, wherein said ferroelectric liquid crystal layer includes a polymer reticulate structure which without an electric field stably maintains a state wherein two types of domains differing in major axis directions of liquid crystal molecules coexist.

With the above arrangement, the polymer reticulate structure forms a three dimensional network which restrains behaviors of the liquid crystal molecules, thereby stably maintaining the state wherein the two types of domains, which differ in the directions of the liquid crystal molecular major axes, coexist in the ferroelectric liquid crystal layer, without the presence of any electric field. Note that the state wherein the two types of domains exist is a monostable state of the ferroelectric liquid crystal layer. When a driving voltage is applied to the electrodes, the state shifts, due to interaction between the electric field applied to the liquid crystal layer due to the driving voltage and the spontaneous polarization of the liquid crystal, to a completely switched state wherein the all the major axes of the liquid crystal molecules are directed in either of the major axis directions of the two types of domains, depending on the direction of the electric field applied. Note that the completely switched state is maintained only while the driving voltage is applied. When the electric field due to the driving voltage disappears, this causes an immediate reaction of the polymer reticulate structure like a bounce and hence causes the major axes of the liquid crystal molecules to be directed in the initial directions, thereby resulting in that the initial monostable state reappears.

In other words, the ferroelectric liquid crystal layer arranged as above is caused to switch among the two completely switched states appearing when the electric field is applied and the state having the two types of domains coexisting, which appears when no electric field is applied. As a result, the above arrangement enables the realization of three types of displays, that is, bright, dark, and halftone displays.

Furthermore, with the above arrangement wherein the liquid crystal layer includes the polymer reticulate structure, improved resistance against pressures, shocks, or the like, and improved stability against temperature changes can be obtained.

Besides, it is preferable that the polymer reticulate structure is made of monomers each having not less than two photopolymerizable functional groups. With this arrangement, the state wherein the two types of domains coexist is more stably maintained without an electric field.

Furthermore, it is preferable that the polymer reticulate structure is made of photopolymerizable monomers which are added to the ferroelectric liquid crystal composition in a ratio of 1 to 50 weight percent.

To solve the problems described above, a manufacturing method of a ferroelectric liquid crystal element of the present invention includes the steps of (a) introducing, between a pair of substrates each having electrodes, a mixture of a liquid crystal composition having a ferroelectric liquid crystal phase and photopolymerizable monomers, and (b) forming a polymer reticulate structure by photopolymerizing the photopolymerizable monomers in a state where two types of domains which differ in major axis directions of liquid crystal molecules coexist in the ferroelectric liquid crystal phase.

By the above method, the photopolymerizable monomers added to the liquid crystal composition are photopolymerized in the state wherein the two types of domains which differ in major axis directions of the liquid crystal molecules coexist in the ferroelectric liquid crystal phase, so that the polymer reticulate structure is formed in the liquid crystal layer. Therefore, the liquid crystal molecules, arranged as above so that the two domains coexist, are restrained by the polymer reticulate structure. This results in that the state wherein the two types of domains coexist can be stably maintained without an electric field.

Thus, the ferroelectric liquid crystal element manufactured by the above method, without an electric field, exhibits a stable state wherein the two types of domains coexist in the liquid crystal layer, whereas with the application of a driving voltage to the electrodes the ferroelectric liquid crystal element exhibits a switched state due to the interaction between the applied electric field to the liquid crystal layer in accordance with the driving voltage and the spontaneous polarization. In the switched state, the major axes of the liquid crystal molecules are directed in either of the respective molecular axis directions of the two types of domains, in accordance with the direction of the electric field applied to the liquid crystal layer due to the driving voltage. Note that the switched state is maintained only while the driving voltage is applied. When the application of the driving voltage is suspended, this causes an immediate reaction of the polymer reticulate structure like a spring and hence causes the major axes of the liquid crystal molecules to be directed in the initial directions, thereby resulting in that the initial monostable state reappears.

As a result, the ferroelectric liquid crystal element arranged as above is caused to switch among the two completely switched states appearing when the electric field is applied and the state in which the two types of domains coexist and which appears when no electric field is applied. As a result, the above arrangement enables the realization of three types of displays, that is, bright, dark, and halftone displays.

Another manufacturing method of a ferroelectric liquid crystal element in accordance with the present invention includes the steps of (a) introducing a mixture of photopolymerizable monomers and a liquid crystal composition having a negative dielectric anisotropy and exhibiting a ferroelectric liquid crystal phase, between a pair of substrates each having electrodes, (b) causing a state wherein two types of domains differing in major axis directions of liquid crystal molecules coexist in a ferroelectric liquid crystal layer, and (c) forming a polymer reticulate structure by photopolymerizing the photopolymerizable monomers while applying an AC voltage to the electrodes, the AC voltage causing an AC electric field which causes an AC stabilization effect to be generated in the ferroelectric liquid crystal layer.

By the above method, the photopolymerizable monomers added to the liquid crystal composition are photopolymerized in a state wherein the two types of domains coexist in the liquid crystal layer, so that the polymer reticulate structure is formed in the liquid crystal layer. By this method, the ferroelectric liquid crystal element manufactured by the above method is made capable of three displays, that is, bright, dark, and half tone displays. Besides, according to the above manufacturing method, the AC electric field causing the AC stabilization effect is applied in the ferroelectric liquid crystal phase when the polymer reticulate structure is being formed, thereby resulting in that fluctuation of the liquid crystal molecules is restrained due to the AC stabilization effect. Therefore, by the method, an apparent angle between the respective major axis directions of the liquid crystal molecules in the two types of domains is made greater. As a result, contrast and brightness can be improved.

Note that it is preferable that the AC voltage has a frequency of 1 kHz to 5 MHz, and a voltage amplitude of 1 V to 20 V per 1 µm in cell thickness, so that a remarkable AC stabilization effect is caused.

Regarding the above manufacturing methods, it is preferable that each photopolymerizable monomer has not less than 2 photopolymerizable functional groups. Besides, it is preferable that the photopolymerizable monomers are added to the liquid crystal composition in a ratio of 1 weight percent to 50 weight percent.

Furthermore, to solve the above-described problems, a manufacturing method of a liquid crystal element of the present invention includes the steps of (a) introducing a mixture of non-liquid crystal photopolymerizable monomers and a liquid crystal composition having a phase in which an electro-optical response can be observed, between a pair of substrates each having electrodes, (b) causing the liquid crystal composition to have a phase transition to the phase in which the electro-optical response can be observed, and (c) forming a polymer reticulate structure in the liquid crystal composition by photopolymerizing the photopolymerizable monomers while applying an AC voltage to the electrodes, the AC voltage generating an AC electric field to which the liquid crystal responds.

By the described method, the photopolymerizable monomers are polymerized under an electric field causing the liquid crystal molecules to make sequential optical responses (switches). Therefore, the polymer reticulate structure is formed in a form and arrangement such that behaviors of the liquid crystal molecules are not restrained. As a result, it is enabled to realize a liquid crystal element which has good resistance against shocks, pressures, and electric shocks as well as stability against temperature changes, without its own electro-optical response properties being reversely affected.

Furthermore, regarding the above-described manufacturing method of a liquid crystal element, it is preferable that each photopolymerizable monomer has not less than 2 photopolymerizable functional groups, and that the photopolymerizable monomers are added to the liquid crystal composition in a ratio of 1 weight percent to 50 weight percent.

For a fuller understanding of the nature and advantages of the invention, reference should be made to the ensuing detailed description taken in conjunction with the accompanying drawings.

BRIEF DESCRIPTION OF THE DRAWINGS

FIG. 10(a) is a schematic view illustrating an alignment of liquid crystal molecules in the SmC* phase having ferroelectricity, and FIG. 10(b) is a schematic view illustrating a molecular alignment and electric dipole moment directions of liquid crystal molecules when (i) liquid crystal molecules in a cell whose thickness is smaller than a helical pitch no longer have a helical structure and (ii) an electric field is applied, which is directed from the reverse side to the front side of the paper having the figure so as to be perpendicular to the sheet of paper.

FIG. 11 is a schematic view illustrating an operation principle of a surface stabilized ferroelectric liquid crystal (SSFLC) element.

DESCRIPTION OF THE PREFERRED EMBODIMENTS

<First Embodiment>

The following description will discuss an embodiment of the present invention, with reference to FIGS. 1 through 6.

A ferroelectric liquid crystal cell (ferroelectric liquid crystal element) in accordance with the present embodiment is basically characterized in that (1) a liquid crystal layer, composed of a ferroelectric liquid crystal composition and a polymer reticulate structure, is provided between a pair of substrates each having at least electrodes, and (2) three types of displays, i.e., dark, bright, and halftone displays, are possible.

The structure of the ferroelectric liquid crystal cell and the manufacturing processes of the same will be discussed in the following description, with reference to FIGS. 1 and 2.

Figure 2:
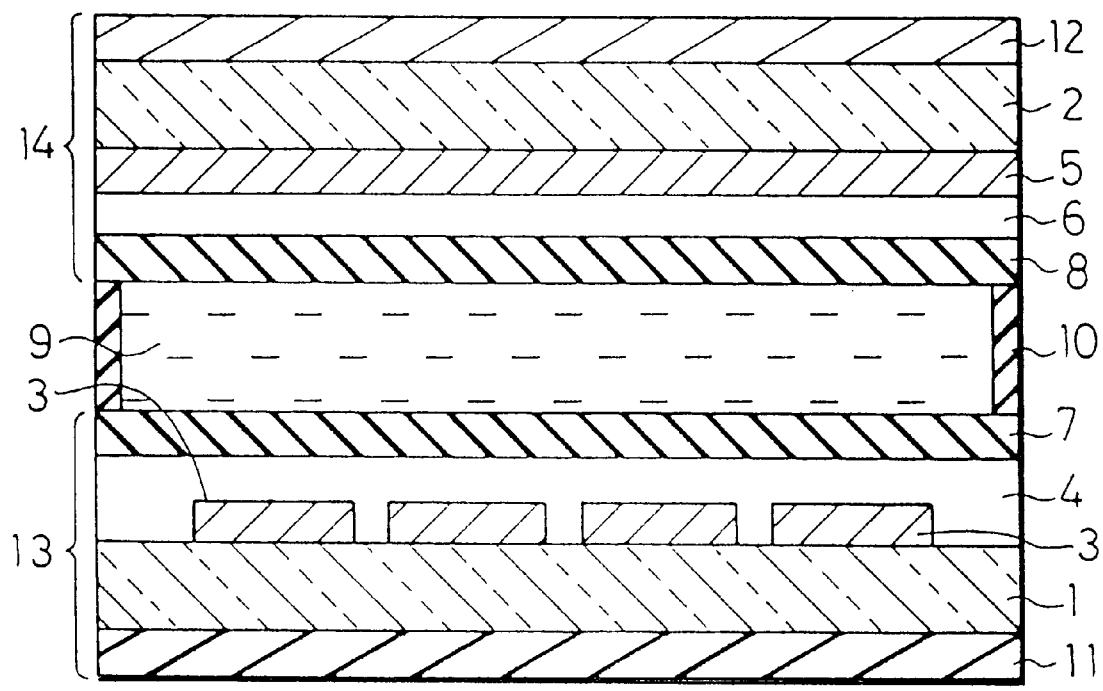
FIG. 2 is a cross-sectional view illustrating a schematic arrangement of the ferroelectric liquid crystal cell.

As shown in FIG. 2, the ferroelectric liquid crystal cell has glass substrates 1 and 2 oppositely provided. On the glass substrates 1 and 2, there are provided transparent signal electrodes 3 and scanning electrodes 5 both in a stripe form, respectively. Thereon provided are insulating films 4 and 6, and alignment films 7 and 8, respectively, and a liquid crystal layer 9 is provided therebetween.

On the outer sides of the glass substrates 1 and 2, polarizing plates 11 and 12 are provided, respectively. The polarizing plate 11, the glass substrate 1, the signal electrodes 3, the insulating film 4, and the alignment film 7 constitute an electrode substrate 13. Likewise, the polarizing plate 12, the glass substrate 2, the scanning electrodes 5, the insulating film 6, and the alignment film 8 constitute an electrode substrate 14. The liquid crystal layer 9 is composed of the liquid crystal composition containing the polymer reticulate structure, and has a layer structure substantially perpendicular to the electrode substrates 13 and 14.

The polarizing plates 11 and 12 are provided so that respective polarization axes of the same are orthogonal to each other. There are also provided spacers (not shown) between the electrode substrates 13 and 14 so that a gap therebetween is kept constant and even.

Figure 1:
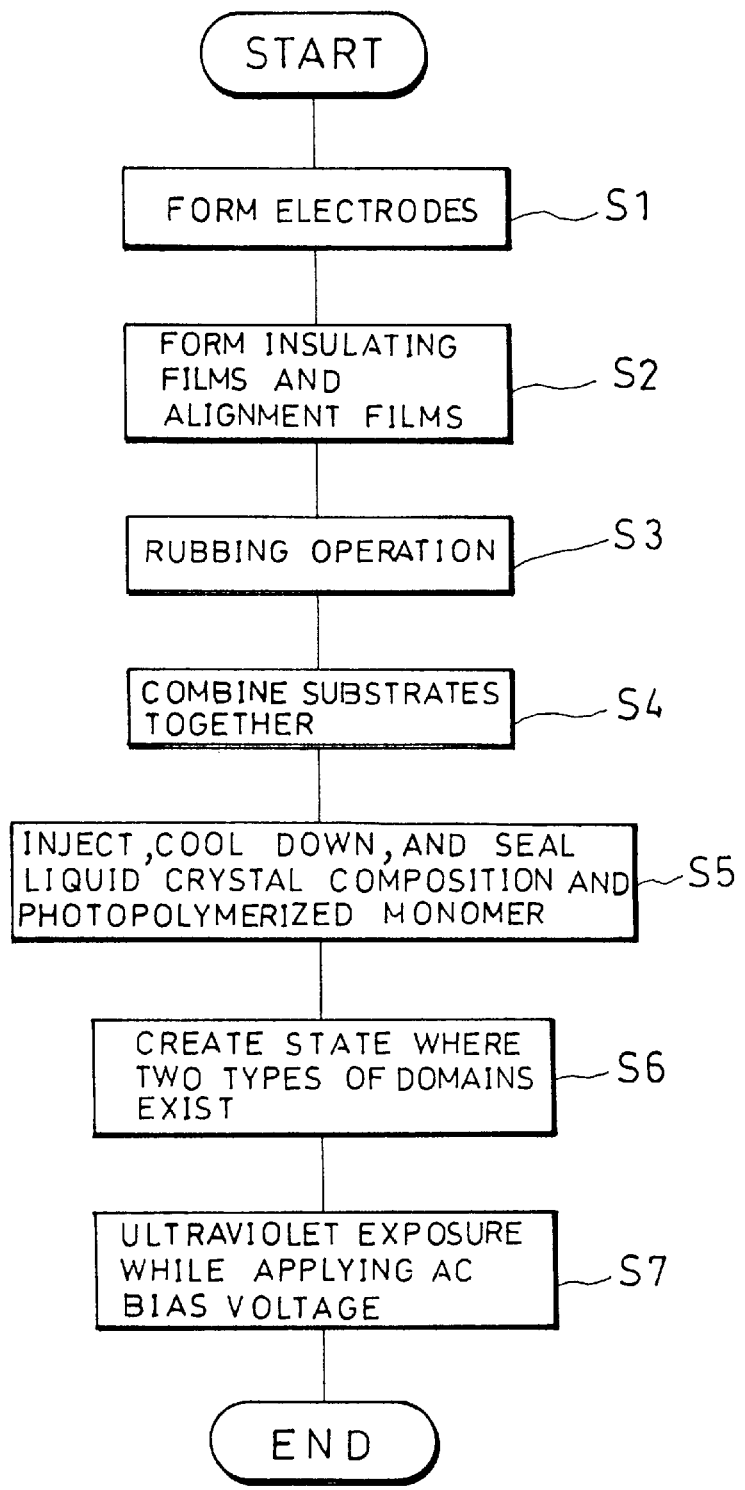
FIG. 1 is a flowchart illustrating major manufacturing processes of a ferroelectric liquid crystal cell in accordance with one embodiment of the present invention.

The following description will explain the manufacturing processes of the ferroelectric liquid crystal cell, while referring to the flowchart in FIG. 1. First of all, the signal electrodes 3 and the scanning electrodes 5 are formed on the surfaces of the glass substrates 1 and 2, respectively, so that the signal and scanning electrodes 3 and 5 have a stripe form and a thickness of 100 nm each, with the use of indium tin oxide (ITO) (the first step, which is hereinafter referred to as S1 (other steps described below are also referred to likewise)). Sequentially, on the signal and scanning electrodes 3 and 5, $SiO_2$ is provided 120 nm thick each so as to form the insulating films 4 and 6, and further, the alignment films 7 and 8 made of polyimide are formed with a thickness of 50 nm each (S2). Sequentially, a rubbing operation is carried out with respect to the surfaces of the alignment films 7 and 8 (S3). Then, the two substrates are combined together with about 1.4 µm thick spacers provided therebetween (S4).

Thereafter, a ferroelectric liquid crystal composition having a negative dielectric anisotropy to which diacrylate monomers of a non-liquid crystal type and a polymerization initiator are added is injected between the two substrates thus combined together at a temperature of 110° C. Then, it is gradually cooled down to room temperature by 1.0° C. per minute, and is sealed with the use of a sealer 10 (S5).

Note that a mixture ratio of the diacrylate monomers to the ferroelectric liquid crystal composition is 1.0 weight percent, and the ferroelectric liquid crystal composition exhibits the following phase transition:

I phase—(101° C.)—N* phase—(89° C.)—SmA phase—(69° C.)—SmC* phase where I phase is an isotropic phase, N* phase is a chiral nematic phase, SmA phase is a smectic A phase, and SmC* phase is a chiral smectic C phase. The temperatures described in the parentheses are respective transition temperatures between the phases. Through the processes described above, the outline of the ferroelectric liquid crystal cell provided with the liquid crystal layer 9 exhibiting the SmC* phase which is a ferroelectric liquid crystal phase is substantially completed.

In the next stage, a state where two types of domains differing in the molecular major axis directions coexist in the liquid crystal layer 9 is created by carrying out ON/OFF operation of a voltage with respect to the signal electrodes 3 and the scanning electrodes 5 of the ferroelectric liquid crystal cell at room temperature (25° C.) (S6). Here, a voltages having any waveform, such as a sinusoidal waveform or a rectangular waveform, can be used as a voltage applied to the electrodes, and the ratio of the two types of domains varies with conditions such as a waveform of the voltage applied, ON/OFF timings of the voltage, or the like. In this embodiment, a state where the two types of domains substantially evenly exist is created.

Sequentially, in the state obtained by S6 where the two types of domains differing in the molecular major axis directions substantially evenly exist between the electrodes, ultraviolet exposure at a strength of 3.3 $mW/cm^2$ is carried out for 5 minutes while applying an AC voltage of 100 kHz and 8 V to the liquid crystal layer 9 with the use of the signal electrodes 3 and the scanning electrodes 5. Note that the AC voltage has a rectangular waveform. With this, the monomers added to the ferroelectric liquid crystal composition are photopolymerized, a polymer reticulate structure is formed in the liquid crystal layer 9. As a result, the state, where the two types of domains differing in the molecular major axis directions evenly exist between the electrodes, is caused to stably exist without application of an electric field.

Note that the AC voltage applied to the liquid crystal layer 9 when the ultraviolet exposure is carried out in S7 does not directly act on the formation of the polymer reticulate structure, but has an effect of enhancing the contrast with relation to switching (described later) of the liquid crystal layer 9 among three states. This effect will be also discussed later.

Figure 3:
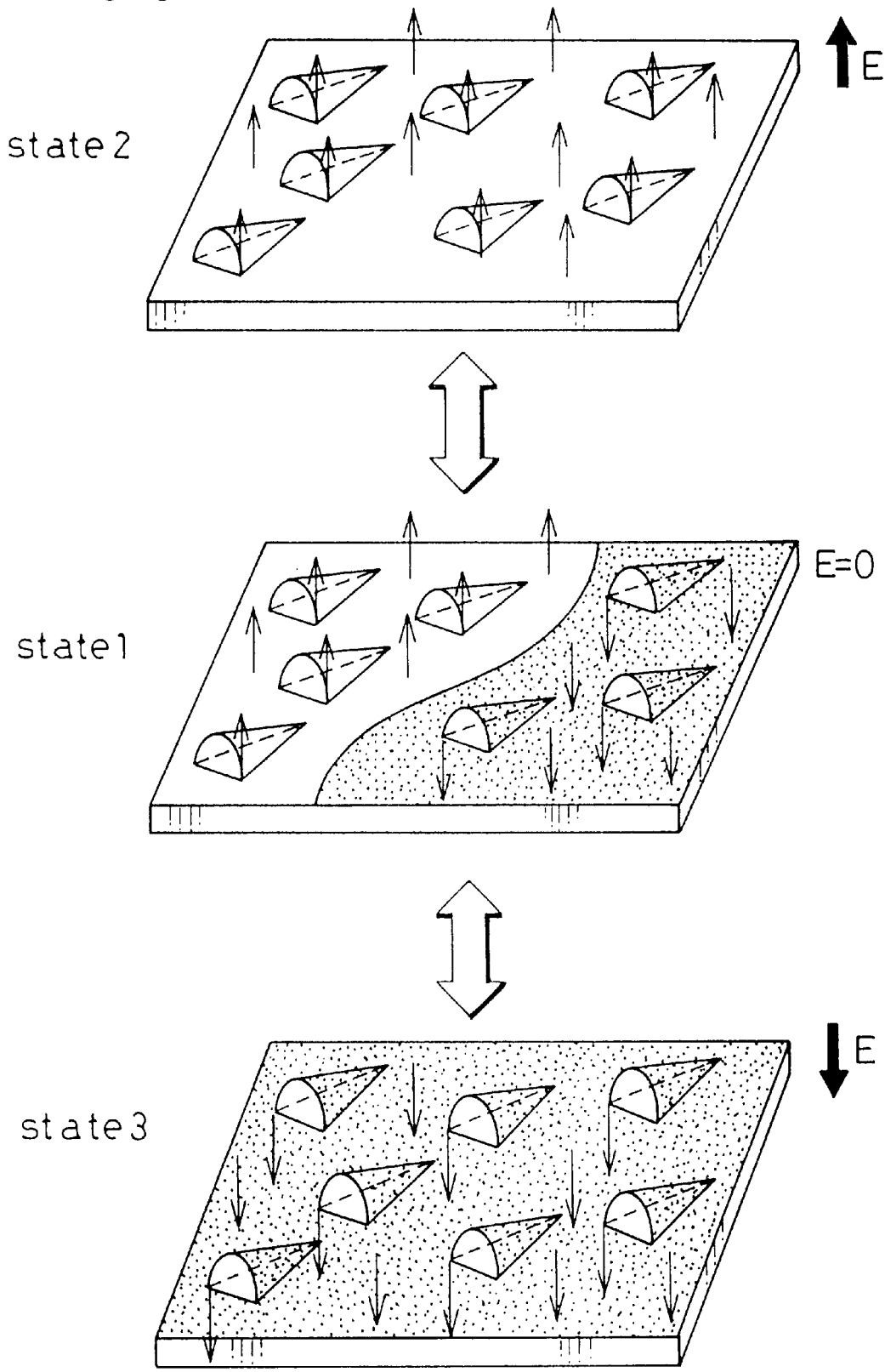
FIG. 3 is a schematic view illustrating three states of alignment of liquid crystal molecules in the liquid crystal layer of the ferroelectric liquid crystal cell. The alignment of the liquid crystal molecules switches in accordance with an electric field E applied thereto, thereby realizing three displays of a bright display (state 2), a dark display (state 3), and a halftone display (state 1) in the ferroelectric liquid crystal layer.

Here, the following description will explain the operation of the ferroelectric liquid crystal cell manufactured through the above-described processes, with reference to FIG. 3. The ferroelectric liquid crystal cell switches over three states macroscopically, as shown in FIG. 3.

The state 1 of the figure schematically illustrates an alignment of the liquid crystal layer 9 when no electric field is applied. The polymer reticulate structure, formed in a three-dimensional network form in the liquid crystal layer 9 through the processes of S6 and S7 described above, geometrically restrains behaviors of the liquid crystal molecules. Therefore, when no electric field is applied, the liquid crystal layer 9 is in a stable state, where two types of domains differing in the molecular major axis directions coexist, as illustrated by the state 1 of FIG. 3.

When a DC electric field is applied to the liquid crystal layer 9 in the stable state, the alignment of the liquid crystal molecules changes in accordance with a direction of the electric field applied, due to interaction between the electric field thus applied and the spontaneous polarization. As a result, the liquid crystal layer 9 is switched either to the state 2 or to the state 3 in accordance with the direction of the electric field applied. Note that the states 2 and 3 are maintained only while the DC electric field is applied. When the electric field disappears, which causes an immediate reaction of the polymer reticulate structure like a spring, the liquid crystal layer 9 is immediately switched to the stable state (state 1).

Since it is thus possible to switch the liquid crystal layer 9 among the three states, it is possible to carry out displays of three tones, i.e., the bright display (state 2), the dark display (state 3), and the halftone display (state 1), by providing the polarizing plates 11 and 12, whose polarization axes are orthogonal to each other, so that one of the molecular major axis directions in the states 2 and 3 is parallel to one of the polarization axes of the polarizing plates 11 and 12.

As described, in S6, the state 1 is arranged so that in the state the two types of domains substantially evenly coexist. However, by arbitrarily adjusting the proportion of the two types of domains by in S6 adjusting conditions such as the waveform and the ON/OFF timings of the voltage applied, it is possible to obtain a desired halftone display.

The following description will explain effects of the AC voltage which is applied during the ultraviolet exposure in S7. The AC voltage (hereinafter referred to as AC bias voltage) causes an AC stabilization effect, which is reported by J. C. Jones, et al (see J. C. Jones, M. J. Towler, and E. P. Raynes: Ferroelectrics, 1991, vol. 121, pp. 91–102). The AC stabilization effect is a phenomenon as follows: when the AC bias voltage is applied to a ferroelectric liquid crystal having a negative dielectric anisotropy, fluctuation of the liquid crystal molecules is suppressed, thereby making greater an apparent angle (memory angle) between the molecular major axes in the bistable state.

Conventionally, there has been proposed a driving method whereby the fluctuation of the liquid crystal molecules is suppressed and a display having high contrast and brightness is realized by applying, during a non-selection period, the AC bias voltage which causes the AC stabilization effect. On the other hand, the applicants of the present invention discovered that: by applying the AC bias voltage when the polymer reticulate structure is formed in the liquid crystal layer 9 so as to cause the same effect as the AC stabilization effect, the apparent angle (hereinafter referred to as apparent memory angle) between the liquid crystal molecules' major axis direction in the state 2 and that in the state 3 is made greater, thereby resulting in that a display with high contrast and brightness is realized.

Figure 5:
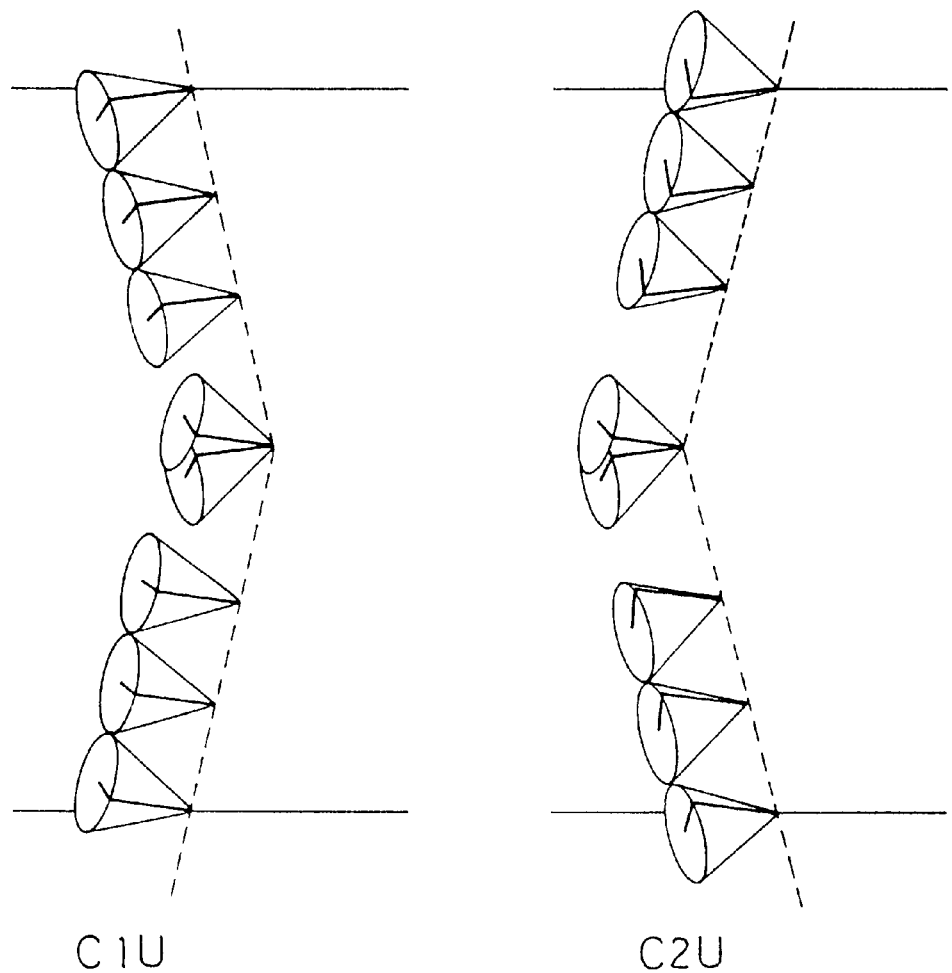
FIG. 5 is a schematic view illustrating two types of alignment (C1U alignment, C2U alignment) of liquid crystal molecules of the liquid crystal layer having a chevron structure in the SmC* phase.

The following description will briefly discuss the above-mentioned driving method which has conventionally been proposed. The driving method is applied to a ferroelectric liquid crystal having a negative anisotropy, and is usually called $\tau$-$V_{min}$ mode. FIG. 5 is a schematic view illustrating two types of alignment of liquid crystal molecules of a liquid crystal layer having a chevron structure in the SmC* phase, and the driving method of the $\tau$-$V_{min}$ mode is applied to the C2U alignment shown in the figure.

Figure 4A:
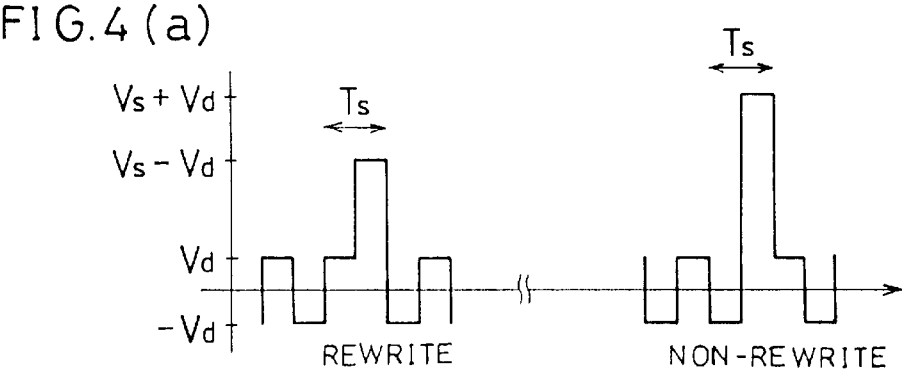
FIGS. 4(a) through 4(d) are waveform charts illustrating examples of rewrite and non-rewrite pulses of a driving method of the $\tau$-$V_{min}$ mode utilizing the AC stabilization effect.
Figure 4B:
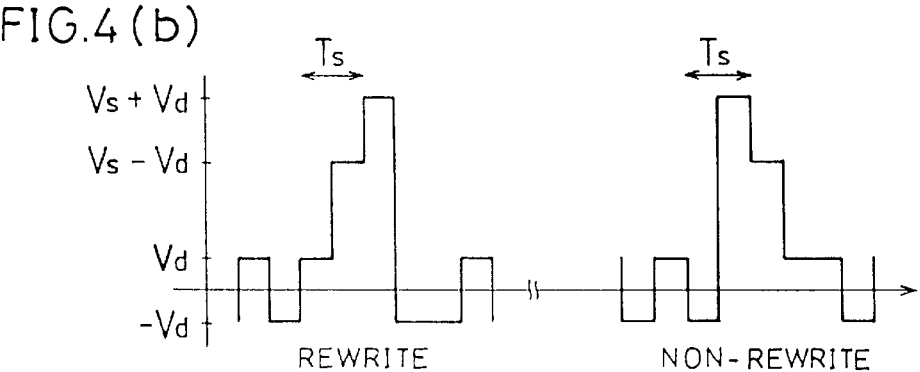
Figure 4C:
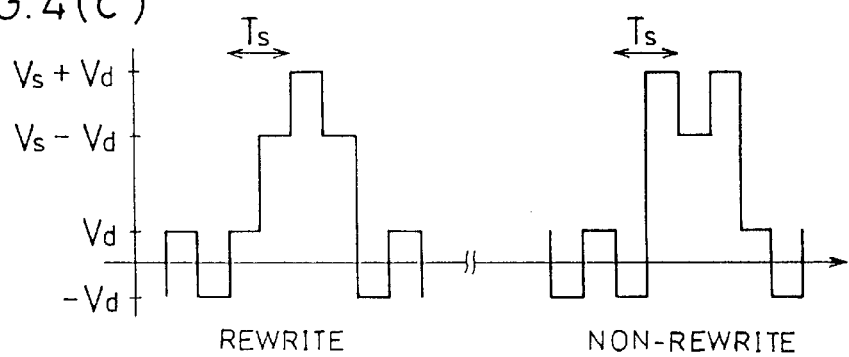
Figure 4D:
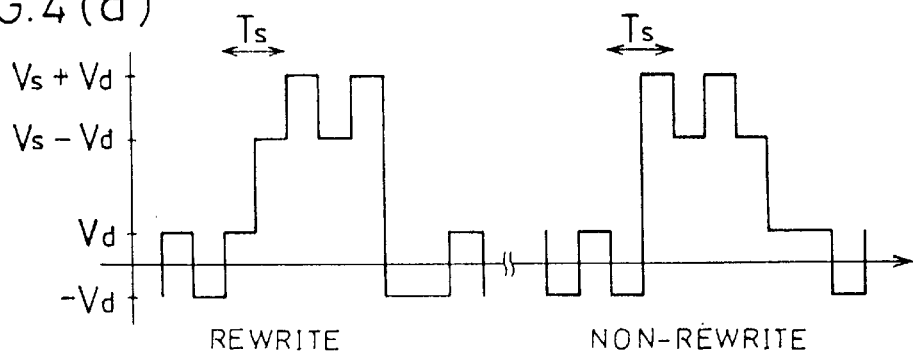

Forms of pulses applied to the liquid crystal according to typical conventional driving methods of the $\tau$-$V_{min}$ mode are illustrated in FIGS. 4(a) through 4(d) The conventional driving method utilizing the pulse having a waveform shown in FIG. 4(a) is described in detail in 'THE "JOERS/ALVEY" FERROELECTRIC MULTIPLEXING SCHEME' by P. W. H. Surguy et al. (Ferroelectrics, 1991, Vol. 122, PP.63–79). The conventional driving method respectively utilizing the pulses having waveforms shown in FIGS. 4(b) through 4(d) are described in detail in the PCT International Application No. WO92/02925 and others.

According to the driving method of the $\tau$-$V_{min}$ mode, with respect to a matrix-type electrode configuration having scanning electrodes and signal electrodes, a selection voltage ($V_s$) is applied to the scanning electrodes during a selection period while a data voltage ($\pm V_d$) is also applied to the signal electrodes during the same selection period, the data voltage having a waveform which changes depending on whether display data are rewritten or not. Then, a difference between the selection voltage and the data voltage is given to the liquid crystal as a driving voltage.

As shown in FIGS. 4(a) through 4(d), according to the driving method of the $\tau$-$V_{min}$ mode, in the case where displayed data are to be rewritten during the selection period ($T_s$), application of a prepulse is followed by application of a rewrite pulse ($V_s$−$V_d$) as the driving voltage, the rewrite pulse having the same polarity as that of the prepulse. On the other hand, in the case where displayed data are not to be rewritten, the application of the prepulse is followed by application of a non-rewrite pulse ($V_s$+$V_d$) having a polarity reverse to that of the prepulse. It is characteristic that a higher driving voltage is applied during a non-rewrite operation than that during a rewrite operation. Further, the bias voltage of $\pm V_d$ being applied during the non-selection period, this vias voltage has an effect of suppressing the fluctuation of the liquid crystal molecules as described above and hence decreasing leak of light.

So as to form the ferroelectric liquid crystal cell in accordance with the present embodiment, the photopolymerizable monomers are polymerized by projecting light thereon while applying the AC bias voltage thereto, in a state where the two types of domains differing in the molecular major axis directions coexist in the ferroelectric liquid crystal phase. With the application of the AC bias voltage, the state is created wherein the liquid crystal molecules in the respective two types of domains remain unswitched and the fluctuation of the liquid crystal molecules is suppressed due to the AC stabilization effect.

By transforming the photopolymerizable monomers into a polymer reticulate structure in the above-described state, the state wherein the respective molecular major axis directions of the two types of domains form a greater angle (apparent memory angle) is caused to stably exist, even when no electric field is applied. As a result, the brightness in the state 2, namely, a bright state, is enhanced, while the leak of light in the state 3, namely, a dark state, is suppressed, thereby enabling a display with a high contrast and brightness to be realized.

In the present embodiment, the AC bias voltage applied in S7 has a frequency of 100 kHz and a voltage amplitude of 8 V, but this is just an example. It is preferable that the AC bias voltage for causing the AC stabilization effect has a frequency of 1 kHz to 5 MHz. Furthermore, the voltage amplitude of the AC bias voltage, which is substantially proportional to a cell thickness (thickness of the liquid crystal layer 9), is preferably 1 to 20 V per 1 $\mu$m in the cell thickness.

Figure 6:
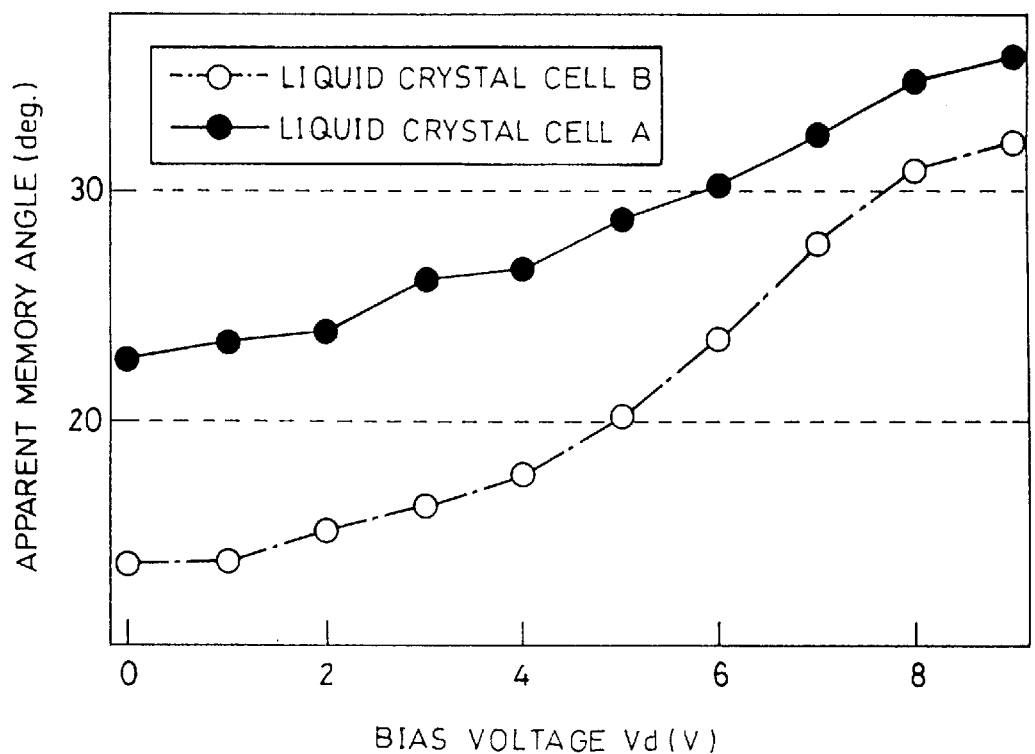
FIG. 6 is a graph of apparent memory angles measured when bias voltages are applied to the ferroelectric liquid crystal cell, and results of the same measurement with respect to a sample for comparison.

FIG. 6 is a graph of bias voltage amplitude-dependency of the apparent angle (apparent memory angle) between the major axis of the molecule in the bright state and that in the dark state, which was measured when an AC bias voltage of 100 kHz was applied to a finished ferroelectric liquid crystal cell in accordance with the present embodiment. Note that the ferroelectric liquid crystal cell in accordance with the present embodiment is referred to as liquid crystal cell A in FIG. 6. A liquid crystal cell for comparison (in FIG. 6, referred to as liquid crystal cell B) was formed by the conventional method. Namely, the liquid crystal cell B was manufactured by filling only a ferroelectric liquid crystal composition which was the same as that used for the ferroelectric liquid crystal cell of the present invention, into a liquid crystal cell manufactured through the above mentioned steps S1 through S4, and cooling it down and sealed it under the same conditions as those for the liquid crystal cell A. The same measurement was carried out with respect to the liquid crystal cell B thus formed by the conventional method, and the measured result is also shown in the figure.

As clear from the figure, the liquid crystal cell A of the present embodiment has a greater apparent memory angle than that of the liquid crystal cell B for comparison, in both the cases where no bias voltage is applied ($V_{d=}0$) and where a bias voltage is applied ($V_{d>}0$). In other words, it can be understood that a display with high contrast and brightness is realized with the use of the ferroelectric liquid crystal cell in accordance with the present embodiment, since the polymer reticulate structure formed in the liquid crystal layer 9 causes the liquid crystal cell of the present embodiment to have a greater apparent memory angle than the conventional liquid crystal cell has.

In addition, the polymer reticulate structure formed in the liquid crystal layer 9 has also an effect of enhancing the shock resistance, such as resistance against shocks and pressures. Furthermore, there is another advantage that harmful influences, caused by charge storage which occurs due to application of a DC electric field, by no means occur in this case.

Furthermore, by effectually using the driving method of the $\tau$-$V_{min}$ mode in driving the ferroelectric liquid crystal cell of the present embodiment, a display with further higher contrast and brightness can be realized. Therefore, with the use of an AC bias electric field having a smaller voltage amplitude than that in the conventional arrangement, it is possible to obtain satisfactory contrast and brightness. As a result, heat emission can be suppressed and consumption of power can be decreased.

Note that any monomers may be added to the liquid crystal composition as material for the polymer reticulate structure, provided that each of the monomers has at least one functional group having a characteristic of photopolymerization, whether the monomers are non-liquid crystal or liquid crystal. But, so as to further more stabilize the state of the liquid crystal layer 9 for the halftone display, it is preferable to use monomers each of which has two or more functional groups having the characteristic of photopolymerization. It is preferable that the photopolymerizable monomers are mixed in the liquid crystal composition in a ratio of 1 to 50 weight percent. In the case where non-liquid crystal monomers are used, it is preferable that the monomers are mixed in the liquid crystal composition in a ratio of 1 to 10 weight percent. In this case of the non-liquid crystal monomers, when the mixture ratio of the monomers is too high, the alignment of the liquid crystal is disordered and the contrast is deteriorated. In the case of liquid crystal monomers are used, the mixture ratio of the monomers may be 1 to 50 weight percent, since it is considered that the liquid crystal monomers have affinity with the liquid crystal composition and hence causes less disorder in the alignment.

Incidentally, a conventional arrangement well known is an arrangement wherein an anisotropic reticulate structure is formed in a ferroelectric liquid crystal layer, as disclosed by the Japanese Publication for Unexamined Pat. Application No.6-194635/1994 (Tokukaihei 6-194635). In this case, the anisotropic reticulate structure is made of chiral monomers, and by the use of the reticulate substance, it is attempted to electrically stabilize minute domains each having a polarization direction opposite to that of its neighboring one.

On the other hand, with the arrangement in accordance with the present embodiment, the liquid crystal molecules and the layer structure are geometrically restrained with the three dimensional network, thereby being stabilized. Therefore, the arrangement of the present embodiment exhibits higher stability, and differs from the arrangement disclosed by the above-mentioned publication. Furthermore, according to the arrangement of the present embodiment, it does not matter whether monomers as the material for the polymer reticulate structure are liquid crystal or non-liquid crystal. A satisfactory effect of enabling the halftone display can be obtained only by adding photopolymerizable monomers of at least one weight percent, whether being liquid crystal or not. Besides, by utilizing the AC stabilization effect, it is possible to realize a ferroelectric liquid crystal cell with further enhanced contrast.

As has been so far described, the ferroelectric liquid crystal cell of the present embodiment has a ferroelectric liquid crystal layer between a pair of substrates each having electrodes, and the ferroelectric liquid crystal layer includes a polymer reticulate structure which, without an electric field, stably maintains a state wherein two types of domains differing in major axis directions of liquid crystal molecules coexist.

In the case as above where the state wherein two types of domains differing in major axis directions of liquid crystal molecules coexist is stably maintained by the polymer reticulate structure without an electric field and a driving voltage is applied to the electrodes, the major axis directions of the liquid crystal molecules are uniformly directed in a direction same as either of the molecular major axis directions of the two domains, in accordance with a direction of the electric field applied to the liquid crystal layer due to the driving voltage. Therefore, the three displays, namely, bright, dark and half tone displays, are possible. Furthermore, since the liquid crystal layer includes the polymer reticulate structure, resistance against shocks, pressures, or the like, is enhanced, whereas stability against temperature changes is also improved. In other words, the following effect can be obtained: the ferroelectric liquid crystal cell with which the half tone display is possible and which has enhanced stability against external disturbances and temperature changes can be realized.

The ferroelectric liquid crystal cell of the present embodiment is characterized in that the AC voltage, which causes the AC electric field causing the AC stabilization effect to be generated, is applied when the photopolymerizable monomers are photopolymerized so that the polymer reticulate structure is formed in the liquid crystal layer.

With this arrangement, the fluctuation of the liquid crystal molecules at the domains of the two types is restrained, and the apparent angle between the liquid crystal molecules' respective major axis directions in the two types of the domains is made greater. Therefore, the ferroelectric liquid crystal cell is made capable of three types of displays, namely, bright, dark, and half tone displays, while the brightness of the bright display and the contrast are enhanced. Note that it is possible to cause a remarkable AC stabilization effect by arranging so that the AC voltage has a frequency of 1 kHz to 5 kHz and a voltage amplitude of 1 V to 20 V per 1 $\mu$m in the cell thickness.

<Second Embodiment>

Figure 7:
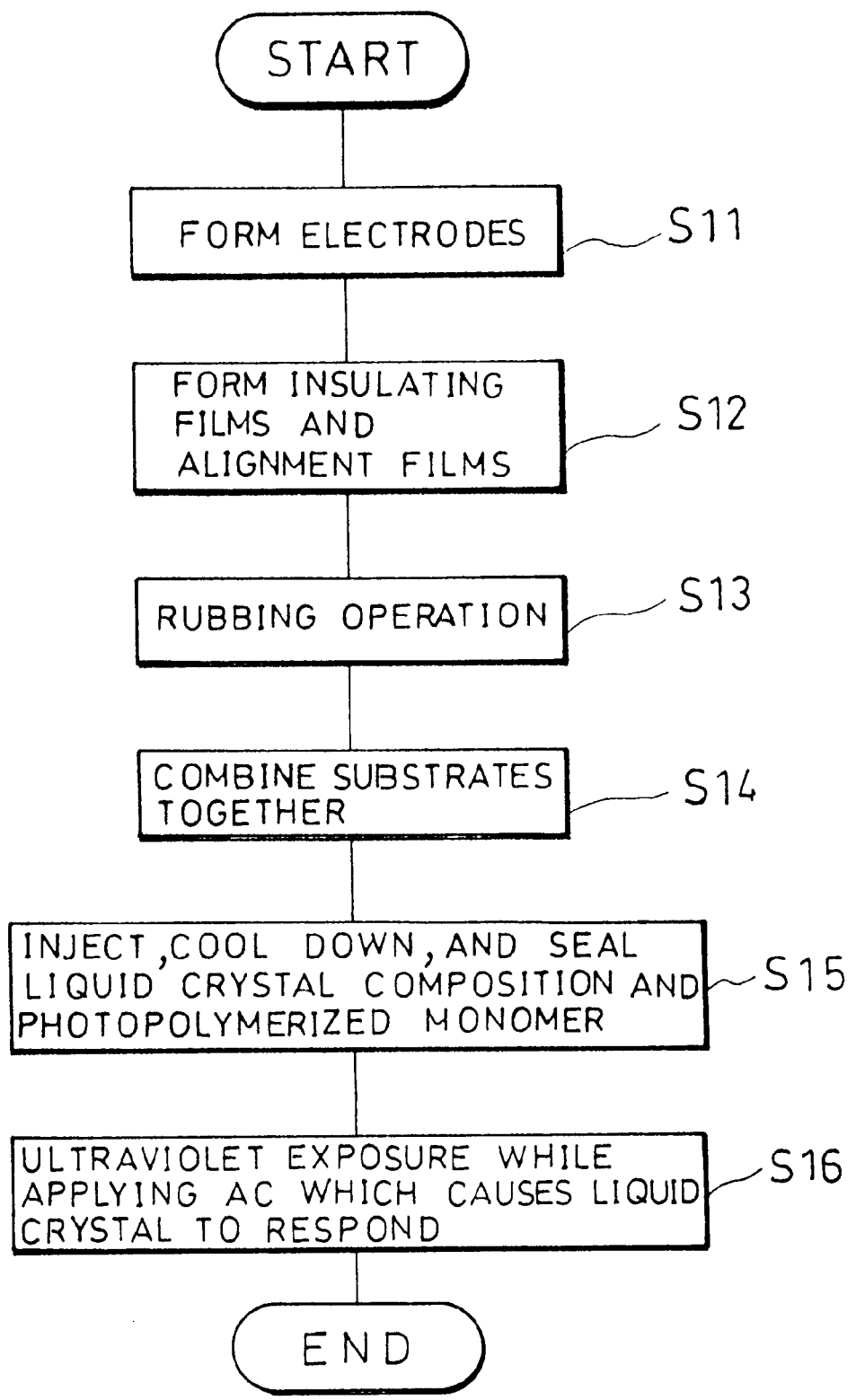
FIG. 7 is a flowchart illustrating major manufacturing processes of a ferroelectric liquid crystal cell in accordance with another embodiment of the present invention.
Figure 8:
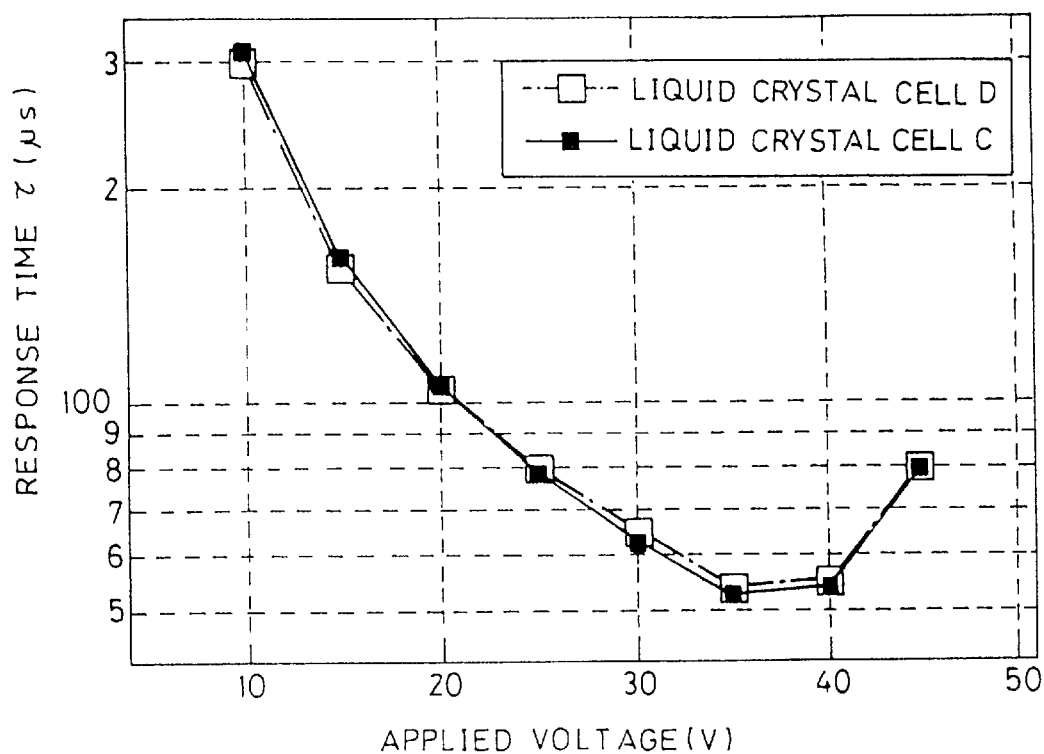
FIG. 8 is a graph illustrating $\tau$-V characteristic of the ferroelectric liquid crystal cell and that of a sample for comparison.
Figure 9:
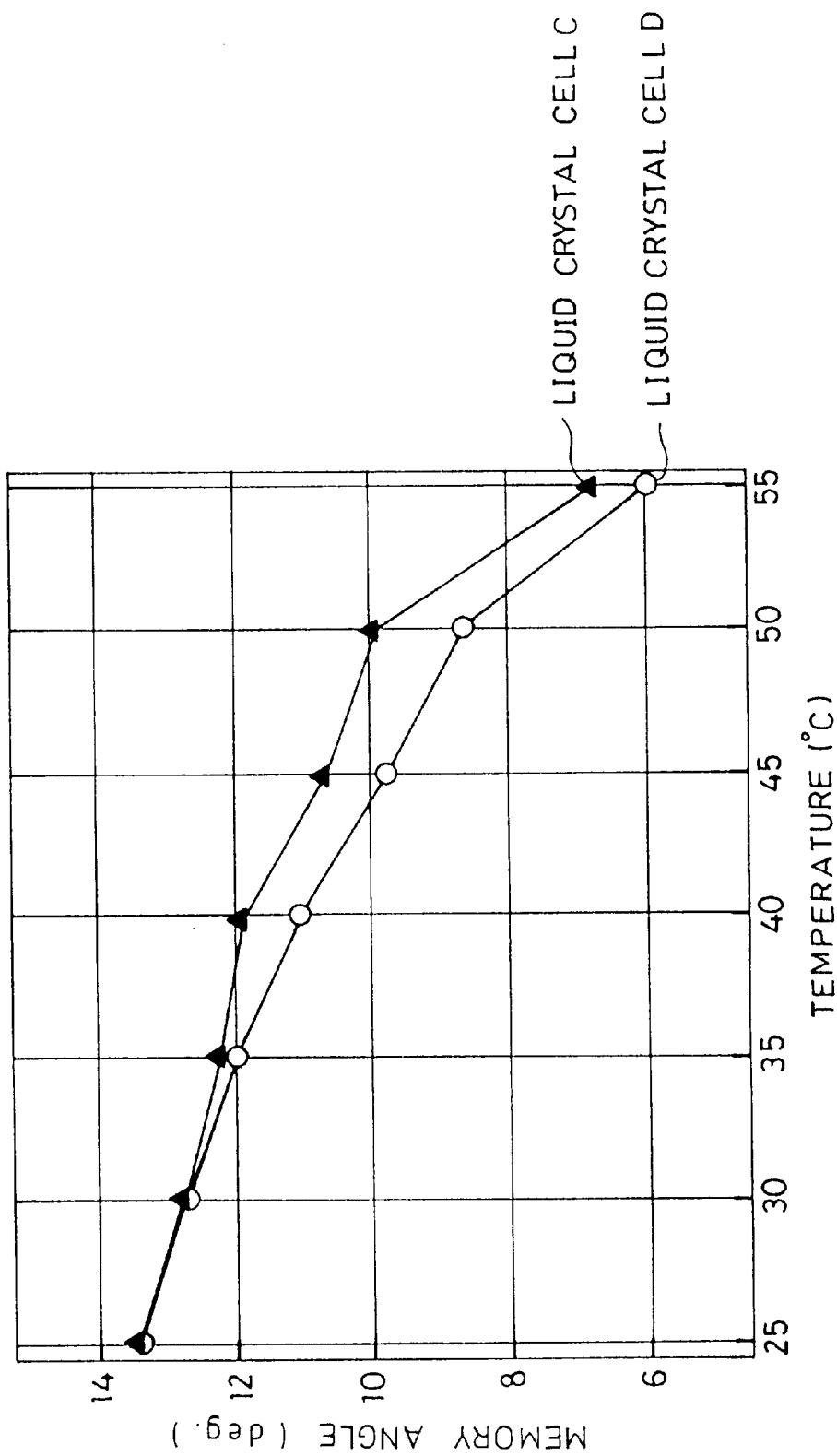
FIG. 9 is a graph illustrating temperature dependency of an apparent angle (memory angle) between major axes of liquid crystal molecules in a bistable state in the ferroelectric liquid crystal cell, and that of a sample for comparison.

The following description will discuss another embodiment of the present invention, with reference to FIGS. 7 through 9. The members having the same structure (function) as those in the above-mentioned embodiment will be designated by the same reference numerals and their description will be omitted.

A ferroelectric liquid crystal cell in accordance with the present embodiment has the same schematic arrangement as that shown in FIG. 2 for the first embodiment, except for material for the liquid crystal layer and the manufacturing processes. Here, manufacturing processes of the ferroelectric liquid crystal cell of the present embodiment will be discussed in the following description, with reference to a flowchart in FIG. 7.

First of all, through the same steps as the above-described steps S1 through S4, a liquid crystal cell is formed (S11 through S14). Then, non-liquid crystal diacrylate monomers and a polymerization initiator are added to "SCE8" produced by Merck Ltd. which is used as the liquid crystal composition, and the material thus produced is injected to the liquid crystal cell formed through the steps S11 through S14 at a temperature 110° C. Then, it is cooled down to room temperature at a speed of 1.0° C. per minute, and the cell is sealed (S15).

In the above material, the mixture ratio of the diacrylate monomers to the liquid crystal composition is 2.0 weight percent. The liquid crystal composition has a negative dielectric anisotropy, and exhibits the following phase transition:

I phase—(98° C.)—N* phase—(78° C.)—SmA phase—(58° C.)—SmC* phase.

Next, at room temperature (25° C.), a 10-minute ultraviolet exposure at a strength of 15.0 mW/cm$^2$ is carried out while applying an AC voltage of 20 kHz and 3 V to the liquid crystal layer so as to sequentially switch the liquid crystal (S16). With this, the diacrylate monomers are photopolymerized, thereby resulting in that a polymer reticulate structure is formed in the liquid crystal layer. Through the above steps, a ferroelectric liquid crystal cell (hereinafter referred to as liquid crystal cell C) is completed.

The ferroelectric liquid crystal cell formed through the above steps was driven so that respective minimum response times $\tau(\mu s)$ that it took for the liquid crystal in a visual field of a microscope to switch at 100 percent were measured at various voltages applied, and the measured result is shown in FIG. 8. In addition, the center of the cell was pressed with the a pressurizer having a round probe with a tip of 1.0 cm$^2$ so that the minimum pressure which caused a defect in the cell was measured, and the result is shown in Table 1 below. Furthermore, respective apparent angles (memory angles) between the major axes of liquid crystal molecules in the bistable state were measured at various temperatures, and the result is shown in FIG. 9.

So as to form a liquid crystal cell by the conventional method for comparison (hereinafter referred to as liquid crystal cell D), "SCE8" produced by Merck Ltd. was injected into a liquid crystal cell formed through the steps S11 through S14, and it was cooled down under the same conditions as above and sealed. The same measurements were carried out with respect to the liquid crystal cell D, and the results are also shown in FIGS. 8 and 9 and Table 1.

TABLE 1

| LIQUID CRYSTAL CELL C | LIQUID CRYSTAL CELL D |
| --- | --- |
| 1.25 | 0.85 |
| | [unit: kgw/cm$^2$] |

As is clear from FIG. 8, the liquid crystal cell C which is a ferroelectric liquid crystal cell in accordance with the present embodiment had the same electro-optical response characteristics as those of the conventional liquid crystal cell (the sample for comparison, i.e., the liquid crystal cell D). In other words, it can be seen that no deterioration of the response characteristics was caused by the polymer reticulate structure formed therein. Furthermore, as is clear from Table 1, the liquid crystal cell C had improved resistance against external pressures such as shocks, or electric shocks. Also as is clear from FIG. 9, the liquid crystal cell C in accordance with the present embodiment has a smaller memory angle change against temperature change in comparison with the liquid crystal cell D, which means that the liquid crystal cell C has more stable driving characteristics against temperature changes.

As described, so as to form the ferroelectric liquid crystal cell in accordance with the present embodiment, the liquid crystal composition to which the photopolymerizable monomers are added is used as material, and the liquid crystal of the liquid crystal layer is switched by applying the AC electric field in a state where the material exhibits the ferroelectric liquid crystal phase, so that the polymer reticulate structure is formed therein. Therefore, the ferroelectric liquid crystal has an advantage that the problem of the conventional ferroelectric liquid crystal cell, that is, being easily affected by shocks, pressures, electric shocks, and temperature changes, is solved, without losing the excellent electro-optical response characteristics of the ferroelectric liquid crystal.

In the above case, the exposure for forming the polymer reticulate structure is carried out when the liquid crystal layer exhibits the ferroelectric liquid crystal phase. However, the same effect can be obtained even in non-ferroelectric phases, provided that the exposure is undertaken in a phase where at least electro-optical response is observed, with the application of an AC electric field which is great enough to cause the liquid crystal molecules to make electro-optical responses. For example, it was confirmed that the same effect was obtained by applying the ultraviolet exposure while applying an AC electric field which causes electroclinic effect when the liquid crystal exhibits the SmA phase so as to form the polymer reticulate structure.

Furthermore, non-liquid crystal monomers were used as material for the polymer reticulate structure in the above case, but liquid crystal monomers may be used instead. It is preferable that the mixture ratio of the monomers to the liquid crystal composition is 1 to 50 weight percent. Note that in the case with the non-liquid crystal monomers, it is more preferable that the ratio thereof to the liquid crystal composition is 1 to 10 weight percent. In the case with the liquid crystal monomers, the preferable range of the mixture ratio thereof is 1 to 50 weight percent, since it is considered that the liquid crystal monomers, having affinity with the liquid crystal composition, do not disorder the alignment of the liquid crystal. Each of the monomers used as material for the polymer reticulate structure preferably has at least one functional group having a characteristic of photopolymerization, but it is more preferable that it has two or more functional groups having a characteristic of photopolymerization. However, this may vary, depending on the mixture ratio.

The present invention should not be limited to the above-described embodiments of the present invention, but various modifications may be allowed within the scope of the invention. For example, though the polymer reticulate structure is formed by the ultraviolet exposure in the above-described embodiments, monomers which are photopolymerized by a visible ray or the like may be used instead so as to form the polymer reticulate structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ferroelectric liquid crystal element, comprising:
a pair of substrates each having electrodes; and
a ferroelectric liquid crystal layer between said substrates,
wherein said ferroelectric liquid crystal layer includes a polymer reticulate structure which, in the presence of an electric field, permits alignment of liquid crystal molecules to exhibit a bright state or a dark state, whereas upon removal of the electric field the polymer reticulate structure substantially immediately switches liquid crystal molecules back to and stably maintains a half-tone state wherein two types of domains differing in major axis directions of liquid crystal molecules stably exist together to exhibit the half-tone state which differs from the bright state and the dark state independent of the state appearing when the electric field was applied.

2. The ferroelectric liquid crystal element as set forth in claim 1, wherein the polymer reticulate structure is formed by photopolymerizing monomers each of which has at least one photopolymerizable functional group.

3. The ferroelectric liquid crystal element as set forth in claim 2, wherein the monomers have characteristics as liquid crystal.

4. The ferroelectric liquid crystal element as set forth in claim 2, wherein the monomers have characteristics as non-liquid crystal.

5. The ferroelectric liquid crystal element as set forth in claim 4, wherein the monomers are added to a composition of ferroelectric liquid crystal in a ratio of 1 weight percent to 10 weight percent.

6. The ferroelectric liquid crystal element as set forth in claim 1, wherein the polymer reticulate structure is formed by photopolymerizing monomers each of which has not less than two photopolymerizable functional groups.

7. The ferroelectric liquid crystal element as set forth in claim 1, wherein the polymer reticulate structure consists essentially of photopolymerizable monomers added to a composition of ferroelectric liquid crystal in a ratio of 1 to 50 weight percent.

8. The ferroelectric liquid crystal element as set forth in claim 1, wherein said ferroelectric liquid crystal has a composition having a negative dielectric anisotropy.

9. A manufacturing method of a ferroelectric liquid crystal element, comprising the steps of:
(a) introducing, between a pair of substrates, each having electrodes a mixture of a liquid crystal composition having a ferroelectric liquid crystal phase and photopolymerizable monomers; and
(b) forming a polymer reticulate structure by photopolymerizing the photopolymerizable monomers in a state where two types of domains which differ in major axis directions of liquid crystal molecules coexist in the ferroelectric liquid crystal phase in order that following photopolymerization the polymer reticulate structure stably maintains a half-tone state wherein the two types of domains differing in major axis directions stably exist together in the absence of an electric field.

10. A liquid crystal element manufactured by the manufacturing method as set forth in claim 9.

11. A manufacturing method of a ferroelectric liquid crystal element, comprising the steps of:
(a) introducing a mixture of photopolymerizable monomers and a liquid crystal composition having a negative dielectric anisotropy and exhibiting a ferroelectric liquid crystal phase, between a pair of substrates each having electrodes;
(b) causing a state wherein two types of domains differing in major axis directions of liquid crystal molecules coexist in a ferroelectric liquid crystal layer; and
(c) forming a polymer reticulate structure by photopolymerizing the photopolymerizable monomers while applying to the electrodes an AC voltage which causes an AC stabilization effect in the ferroelectric liquid crystal layer.

12. The manufacturing method as set forth in claim 11, wherein the AC voltage has a frequency of 1 kHz to 5 MHz, and a voltage amplitude of 1 V to 20 V per 1 $\mu$m in thickness of the ferroelectric liquid crystal layer.

13. The manufacturing method as set forth in claim 12, wherein the AC voltage has a rectangular waveform.

14. The manufacturing method as set forth in claim 11, wherein each monomer has not less than two photopolymerizable functional groups.

15. The manufacturing method as set forth in claim 11, wherein the monomers are added to the liquid crystal composition in a ratio of 1 weight percent to 50 weight percent.

16. The manufacturing method as set forth in claim 11, wherein the monomers have characteristics as liquid crystal.

17. The manufacturing method as set forth in claim 11, wherein the monomers have characteristics as non-liquid crystal.

18. The manufacturing method as set forth in claim 17, wherein the monomers are added to the liquid crystal composition in a ratio of 1 to 10 weight percent.

19. A liquid crystal element manufactured by the manufacturing method as set forth in claim 11.

20. A manufacturing method of a liquid crystal element, comprising the steps of:
(a) introducing a mixture of non-liquid crystal photopolymerizable monomers and a liquid crystal composition having a phase wherein an electro-optical response can be observed, between a pair of substrates each having electrodes;
(b) causing the liquid crystal composition to have a phase transition to the phase in which the electro-optical response can be observed; and
(c) forming a polymer reticulate structure in the liquid crystal composition by photopolymerizing the photopolymerizable monomers while applying to the electrodes an AC voltage for generating an electric field to which the liquid crystal responds.

21. The manufacturing method as set forth in claim 20, wherein each monomer has not less than 2 photopolymerizable functional groups.

22. The manufacturing method as set forth in claim 20, wherein the monomers are added to the liquid crystal composition in a ratio of 1 weight percent to 50 weight percent.

23. The manufacturing method as set forth in claim 20, wherein the monomers have characteristics as liquid crystal.

24. The manufacturing method as set forth in claim 20, wherein the monomers have characteristics as non-liquid crystal.

25. The manufacturing method as set forth in claim 24, wherein the monomers are added to the liquid crystal composition in a ratio of 1 weight percent to 10 weight percent.

26. The manufacturing method as set forth in claim 20, wherein the liquid crystal composition has a negative dielectric anisotropy and exhibits a ferroelectric liquid crystal phase.

27. A liquid crystal element manufactured by the manufacturing method as set forth in claim 20.

* * * * *